(12) United States Patent
Mitchell et al.

(10) Patent No.: US 7,233,672 B2
(45) Date of Patent: Jun. 19, 2007

(54) CONSTANT MODULATION FOR ENHANCING QKD SECURITY

(75) Inventors: J. Howell Mitchell, Amherst, NH (US); Harry Vig, N. Billerica, MA (US); Jonathan Young, Newburyport, MA (US); Alexei Trifonov, Boston, MA (US)

(73) Assignee: MagiQ Technologies, Inc., New York, NY (US)

( * ) Notice: Subject to any disclaimer, the term of this patent is extended or adjusted under 35 U.S.C. 154(b) by 385 days.

(21) Appl. No.: 10/970,043

(22) Filed: Oct. 21, 2004

(65) Prior Publication Data

US 2006/0088159 A1 Apr. 27, 2006

(51) Int. Cl.
*H04L 9/08* (2006.01)
*G02F 1/00* (2006.01)

(52) U.S. Cl. .................................. 380/278; 359/281
(58) Field of Classification Search .................. None
See application file for complete search history.

(56) References Cited

U.S. PATENT DOCUMENTS

| 5,307,410 A | 4/1994 | Bennett |
| 2006/0029229 A1* | 2/2006 | Trifonov et al. ............ 380/256 |

FOREIGN PATENT DOCUMENTS

GB 2 399 220 A 9/2003

OTHER PUBLICATIONS

Gisin et al, "Quantum cryptography," Rev. Mod. Phys. vol. 74 Jan. 2002 pp. 145-195.
Kutsiefer et al, "The breakdown flash of silicon avalanche photodiodes—backdoor for eavesdropper attacks?" arXiv: quant-ph/0104103 v1, Apr. 20, 2001.
Stucki et al., "Quantum key distribution over 67 km with a plug & play system," New Journal of Physics, 4 (2002) 41.1-41.8 (Jul. 12, 2002).

* cited by examiner

*Primary Examiner*—Gilberto Barrón, Jr.
*Assistant Examiner*—Brandon S Bludau
(74) *Attorney, Agent, or Firm*—Opticus IP Law PLLC

(57) ABSTRACT

A method of improving the security of a QKD system is disclosed. The QKD system exchanges qubits between QKD stations, wherein the brief period of time surrounding the expected arrival time of a qubit at a modulator in a QKD station defines a gating interval. The method includes randomly activating the modulator in a QKD station both within the gating interval and outside of the gating interval, while recording those modulations made during the gating interval. Such continuous or near-continuous modulation prevents an eavesdropper from assuming that the modulations correspond directly to the modulation of a qubit. Thus, an eavesdropper (Eve) has the additional and daunting task of determining which modulations correspond to actual qubit modulations before she can begin to extract any information from detected modulation states of the modulator.

10 Claims, 2 Drawing Sheets

CONSTANT MODULATION FOR ENHANCING QKD SECURITY

RELATED APPLICATIONS

The present invention is related to U.S. patent application Ser. No. 10/910,209, entitled "QKD station with EMI suppression," filed on Aug. 3, 2004.

FIELD OF THE INVENTION

The present invention relates to quantum cryptography, an in particular relates to a method of operating a modulator in a quantum key exchange (QKD) system in a manner that makes eavesdropping more difficult, thus enhancing the security of the system.

BACKGROUND OF THE INVENTION

Quantum key distribution involves establishing a key between a sender ("Alice") and a receiver ("Bob") by using weak (e.g., 0.1 photon on average) optical signals or "qubits" transmitted over a "quantum channel." The security of the key distribution is based on the quantum mechanical principle that any measurement of a quantum system in unknown state will modify its state. As a consequence, an eavesdropper ("Eve") that attempts to intercept or otherwise measure the qubits will introduce errors and reveal her presence.

The general principles of quantum cryptography were first set forth by Bennett and Brassard in their article "Quantum Cryptography: Public key distribution and coin tossing," Proceedings of the International Conference on Computers, Systems and Signal Processing, Bangalore, India, 1984, pp. 175-179 (IEEE, New York, 1984). Specific QKD systems are described in U.S. Pat. No. 5,307,410 to Bennett, and in the article by C. H. Bennett entitled "Quantum Cryptography Using Any Two Non-Orthogonal States", Phys. Rev. Lett. 68 3121 (1992).

The general process for performing QKD is described in the book by Bouwmeester et al., "The Physics of Quantum Information," Springer-Verlag 2001, in Section 2.3, pages 27-33. During the QKD process, Alice uses a random number generator (RNG) to generate a random bit for the basis ("basis bit") and a random bit for the key ("key bit") to create a qubit (e.g., using polarization or phase encoding) and sends this qubit to Bob.

The above mentioned references by Bennett each describe a so-called "one-way" QKD system wherein Alice randomly encodes the polarization or phase of single photons at one end of the system, and Bob randomly measures the polarization or phase of the photons at the other end of the system. The one-way system described in the Bennett 1992 paper is based on two optical fiber Mach-Zehnder interferometers. Respective parts of the interferometric system are accessible by Alice and Bob so that each can control the phase of the interferometer. The interferometers need to be actively stabilized to within a portion of quantum signal wavelength during transmission to compensate for thermal drifts.

U.S. Pat. No. 6,438,234 to Gisin (the '234 patent), which patent is incorporated herein by reference, discloses a so-called "two-way" QKD system that is autocompensated for polarization and thermal variations. Thus, the two-way QKD system of the '234 patent is less susceptible to environmental effects than a one-way system.

In the two-way system of the '234 patent, Alice includes an optical phase modulator and a Faraday mirror. The phase modulator is provided with a modulation randomly selected from a set of modulations. The modulation is timed to coincide with the arrival of one of two optical pulses from Bob. The pulses are then sent back to Bob, with one of the pulses having been modulated. The remaining pulse is likewise modulated at Bob. The pulses are interfered, and the resulting interfered pulse is detected. This process is repeated, and the usual QKD protocols and procedures are followed to establish a secure key between Alice and Bob.

It is imperative that a potential eavesdropper (Eve) not be able to discern the activity of Alice's phase modulator. If an eavesdropper were to know the state of Alice's modulator, she would be able to deduce the value of the exchanged pulses (qubits).

Alice's modulator activity is of interest to the QKD system only when qubits are actively being modulated. At times when there are no qubits in the vicinity of Alice, the modulator's value is of no interest because there is nothing to modulate. Consequently, present-day QKD systems leave the modulator at rest when qubits are not present. However, this makes the eavesdropping task for Eve considerably easier because she can focus her concentration on changes in the state of the modulator. If Alice's modulator is active only when it is modulating qubits, then if Eve has electromagnetic interference (EMI) measurement capability or probe-beam capability, there is only a relatively small amount of information that she needs to examine to determine how the qubits were modulated.

SUMMARY OF THE INVENTION

An aspect of the invention is a method of operating a QKD system having a modulator in a manner that makes it more difficult for an eavesdropper to gain information about the modulator states of the system. The method includes activating the modulator to provide first random modulations to the modulator during corresponding gating intervals associated with expected arrival times of a qubit. The method also includes activating the modulator outside of the gating intervals to provide second random modulations to the modulator. The result is that the modulator (e.g., Alice's modulator) is essentially always active, with different modulations being applied constantly, or nearly so, as qubits are exchanged between QKD stations. Consequently, an eavesdropper attempting to gain information about the modulator states needs to figure out which modulator states are actually associated with encoding (modulating) a qubit ("qubit modulations"), and which modulations are not ("jabber modulations").

The activation of the modulator during the expected arrival time of a qubit (i.e., during the "gating interval") is achieved by providing the modulator with a control signal. Activation of the modulator outside of the gating interval is achieved by providing the modulator with a "jabber signal." Both the control signal and the jabber signal may be generated by a voltage controller (modulator driver) provided with a random number from a random number generator (RNG) from either a single RNG or two different RNGs. The random number so provided is used to randomly select a modulator phase from a set of available modulator phases (e.g., $\phi_A = +3\pi/4$, $-3\pi/4$, $\pi/4$, and $-\pi/4$) associated with the QKD protocol.

DETAILED DESCRIPTION OF THE INVENTION

Figure 1:
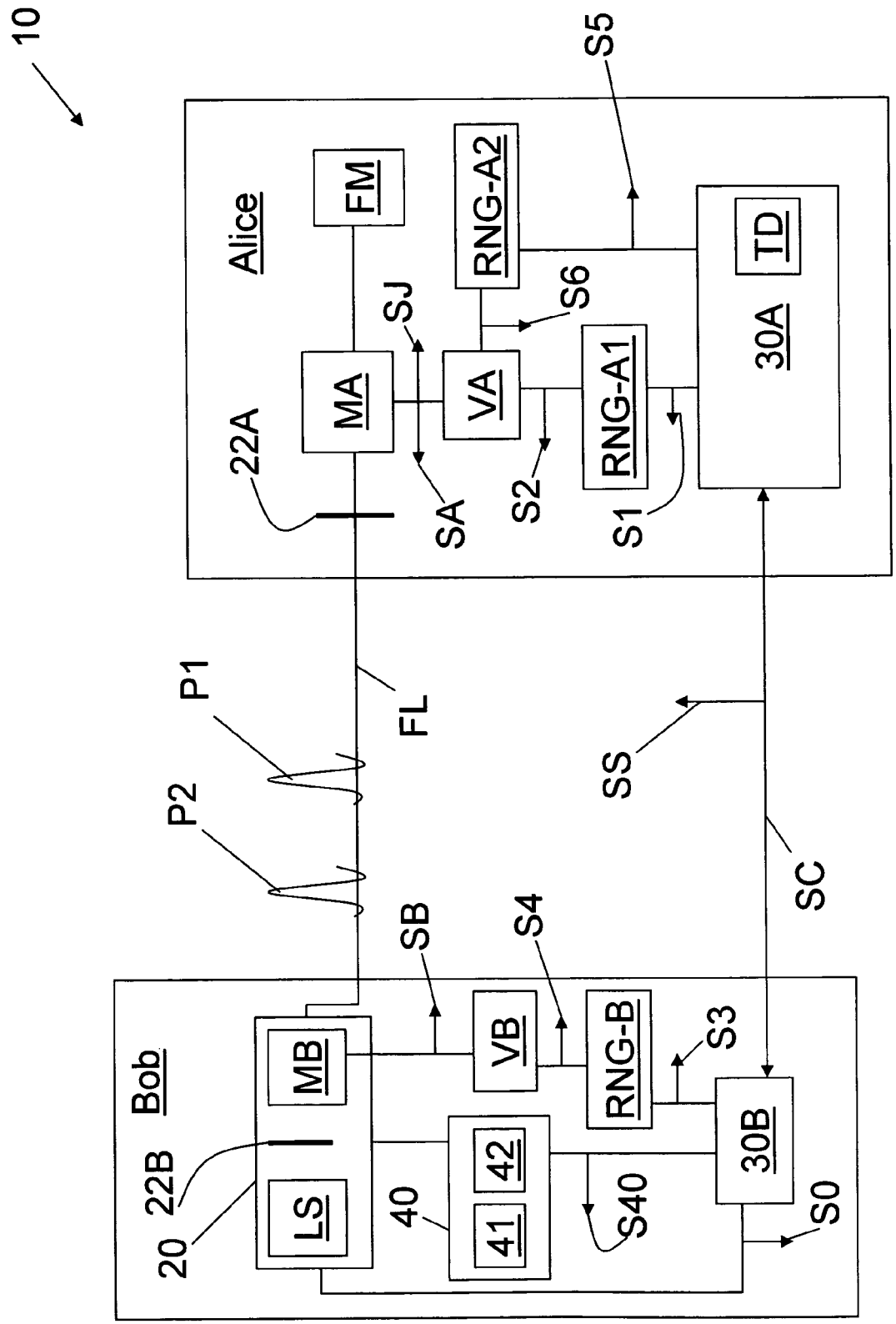
FIG. 1 is a schematic diagram of a two-way QKD system adapted to perform the method of the present invention.

FIG. 1 is a schematic diagram of a two-way QKD system 10 having two QKD stations Bob and Alice linked by an optical fiber link FL. Bob includes an optical system 20 adapted to generate two coherent optical pulses P1 and P2. Optical system 20 also include a phase modulator MB, a laser source LS, and a variable attenuator 22B. Phase modulator MB is coupled to a voltage controller VB, which is coupled to a random number generator unit RNG-B. RNG-B, in turn, is coupled to a controller 30B. Controller 30B is also coupled to optical system 20. Bob also includes a detector unit 40 operably coupled to optical system 20 and to controller 30B. Detector unit 40 includes two single-photon detectors (SPDS) 41 and 42.

Alice includes a phase modulator MA optically coupled at one end to optical fiber link FL and at the opposite end to a Faraday mirror FM. Also optionally includes a variable attenuator 22A upstream of modulator MA. Alice also includes voltage controller VA coupled to phase modulator MA, and a random number generator RNG-A1 coupled to the voltage controller. In an example embodiment, Alice also includes a second random number generator RNG-A2 coupled to voltage controller VA. Alice further includes a controller 30A coupled to random number generators RNG-A1 and RNG-A2.

Bob's controller 30B is coupled (optically or electronically) to Alice's controller 30B via a synchronization channel SC to synchronize the operation of Alice and Bob via synchronization signals SS. In particular, the operation of the phase modulators MA and MB is coordinated by controllers 30A and 30B by exchanging synchronization signals SS that correspond to expected arrival times of qubits (pulses) to be modulated.

Method of Operation

In an example embodiment of the operation of QKD system 10, Bob's controller 30B activates optical system 20 via an activation signal S0 to generate coherent optical pulses P1 and P2 having orthogonal polarizations. The pulses pass through Bob's modulator MB, which remains inactive, and optionally through variable attenuator 22, which attenuates the pulses. The pulses then travel over to Alice via optical fiber link FL.

Pulses P1 and P2 then pass through Alice's phase modulator MA, which remains inactive. The pulses reflect off of Faraday mirror FM, which rotates the polarization of the pulses by 90°. As the pulses travel back through modulator MA, Alice lets the first pulse P1 pass through unmodulated, but modulates the phase (i.e., imparts a phase shift $\phi_A$ to) second pulse P2.

The modulation of pulse P2 at Alice is carried out by controller 30A providing a well-timed signal S1 to random number generator RNG-A1, which provides a signal S2 representative of a random number to voltage controller VA. In response, voltage controller VA sends a randomly selected voltage control signal SA (e.g., V[+3π/4], [V−3π/4], V[+π/4], or V[−π/4]) to modulator MA to set the phase modulation to a corresponding randomly selected phase shift $\phi_A$=+3π/4, −3π/4, π/4, or −π/4.

The two pulses P1 and P2 then pass through attenuator 22A, which ensures that the pulses are single-photon level (i.e., statistically having one photon or less per pulse). The pulses travel back to Bob, where pulse P2 passes unaltered through modulator MB, but where Bob imparts a randomly selected phase shift $\phi_B$ to pulse P1. The modulation is carried out by controller 30B providing a well-timed signal S3 to RNG-B, which provide a signal S4 representative of a random number to voltage controller VB. In response, voltage controller VB sends a randomly selected voltage control signal SB (e.g., V[+π/4] or V[−π/4]) to modulator MB to set the phase modulation to a corresponding value of +π/4 or −π/4.

Further, pulses P1 and P2 enter optical system 20 where they are recombined to interfere. SPDs 41 and 42 are arranged so that constructive interference ($\phi_A-\phi_B=0$) is detected by SPD 41, and destructive interference ($\phi_A-\phi_B=\pi$) is detected by SPD 42.

When Bob imparts the same basis phase as Alice, a count in SPD 41 indicates binary 0 and a count in SPD 42 indicates binary 1. However, when Bob's basis phase is different from Alice's, there is no correlation and the count winds up in either SPD 41 or 42 with equal probability (i.e., the interfered pulse has a 50:50 chance of being detected in either SPD). The resulting detected signal in detection unit 40 is transmitted to controller 30B via a detector signal S40, where the detected phases are stored, along with the modulation states imparted to modulator MB.

Constant Modulation

The description of the operation of QKD system 10 thus far is essentially that of the prior art in that Alice's modulator remains inactive unless it receives a voltage signal SA that is timed to coincide with the arrival of optical pulse P2 as reflected from Faraday mirror FM. However, under the prior art scheme, an eavesdropper that is capable of obtaining information about the modulation state of phase modulator MA need only worry about making the measurement, and not whether the measurement relates to an actual modulation of a qubit (i.e., the modulation of pulse P1 or P2).

Thus, the present invention improves upon the prior art by activating modulator MA even when there is no qubit present to modulate. In this case, eavesdropper Eve would need to sift through much more data to find the small period when the qubits are actually being modulated.

Figure 2:
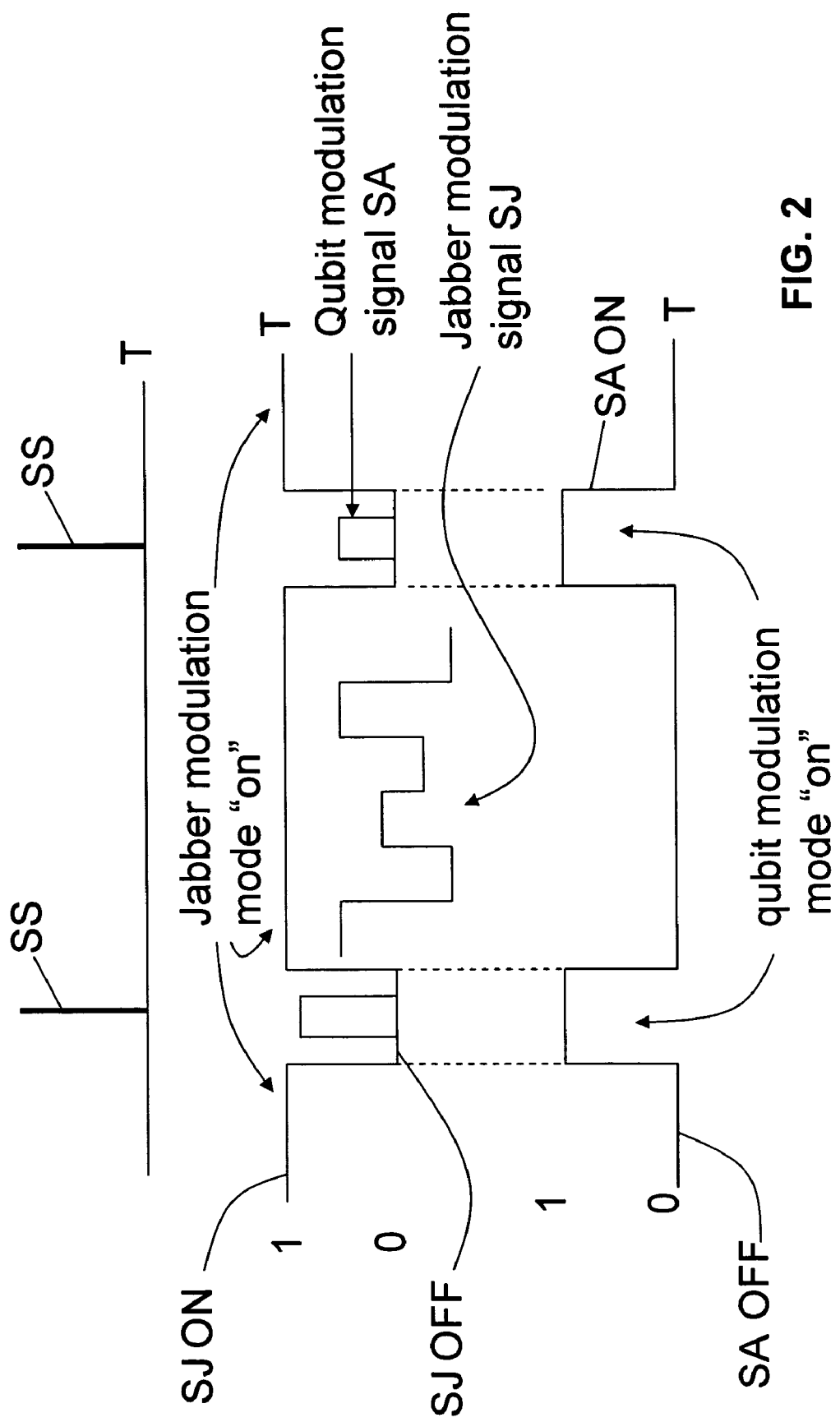
FIG. 2 is a timing diagram of the control signals, the jabber signals and the synchronization signals, illustrating how the control signal activates the modulator during the gating intervals that surround the respective synchronization signals, and how the jabber signal activates the modulator during the time intervals outside of the gating intervals.

FIG. 2 is a timing diagram illustrating the activation of modulator MA relative to the expected arrival of a qubit, as indicated by synchronization signals SS. In an example embodiment, the modulation of a qubit, whose expected arrival is associated with synchronization signal SS, is carried out as described above. Typically, the duty cycle of the sync signal SS is very low, e.g., on the order of 0.5%. Such a low sync duty cycle means that there is a very short period of time over which an eavesdropper can "listen" to the qubit modulation in order to obtain the qubit data.

Thus, for a brief period of time around the expected arrival time (referred to as the "gating interval"), modulator MA is activated by control signal SA from voltage controller VA. This is illustrated in FIG. 2 as control signal SA changing from 0 to 1 (i.e., from off to on) over the gating interval surrounding the synchronization signal SS. Note that in practice, signal SA has a voltage corresponding to the phase to be set.

Outside of the gating interval, controller 30A activates random number generator RNG-A2 via an activation signal S5 to send a random number to voltage controller VA via signal S6. Signal S6, in turn, causes voltage controller VA to send a "jabber signal" SJ to modulator MA. Note also that like control signal SA, the jabber signal SJ in practice has a voltage corresponding to the randomly selected phase. Note also that is preferred that the jabber signals SJ have the same signal width as the control signals SJ so that these two signal types are not discernable to an eavesdropper.

In FIG. 2, the "0" and "1" values correspond to the particular mode—i.e., qubit modulation mode or jabber modulation mode—being enabled. The control signal (i.e., the qubit modulation signal) SA and the jabber signal SJ are also shown (not to scale) for the sake of illustration.

The combination of the control signal SA modulation and the jabber signal SJ modulation results in essentially a constant (i.e., continuous) random modulation of modulator MA, rather than (randomly) activating the modulator only during the short gating interval associated with the expected arrival of a qubit.

Jabber signal SJ drives (activates) modulator MA randomly during jabber mode just as control signal SA does during qubit modulation mode, with the exception that in jabber mode there is no expectation that a qubit will be present. Thus, an eavesdropper intent on discerning the modulation states (i.e., modulation values) of modulator MA associated with encoding the qubits no longer has the benefit of assuming each modulation was for a qubit. Now the eavesdropper has the additional burden of assessing which modulation events actually correspond to qubit modulations and which were merely jabber modulations.

In an example embodiment, the timing window surrounding the gating interval that corresponds to the "jabber mode" is determined by an FPGA or some other such timing device TD in controller 30A. In particular, the timing device TD establishes a timing window for the jabber signal SJ that surrounds all possible worst case periods of time in which qubit modulation could occur. Thus, as mentioned above, timing device TD determines when jabber modulation is to be provided to modulator MA via RNG-A2. Note that in an alternative embodiment, Alice uses only one random number generator (e.g., RNG-A1) to create the control modulation and the jabber modulation.

Controller 30A records which phase modulations were applied to modulator MA during the gating intervals so that a secure key can be established between Alice and Bob using the known QKD protocols and procedures.

While the present invention has been described in connection with preferred embodiments, it will be understood that it is not so limited. On the contrary, it is intended to cover all alternatives, modifications and equivalents as may be included within the spirit and scope of the invention as defined in the appended claims.

What is claimed is:

1. A method of operating a QKD system having a modulator, comprising:

activating the modulator to provide first random modulations during gating intervals, wherein each gating interval corresponds to an expected arrival of a qubit; and activating the modulator outside of said gating intervals to provide second random modulations that do not modulate any qubits.

2. The method of claim 1, wherein the first random modulations are caused by first signals from a first random number generator, and the second random modulations are caused by second signals from a second random number generator.

3. The method of claim 1, wherein the first and second random modulations are based on signals from a single random number generator.

4. The method of claim 1, wherein the first and second modulations are carried out such that the modulator is continuously or nearly continuously modulated during an exchange of qubits.

5. A method of increasing the security of a QKD station having a modulator, comprising:

randomly activating the modulator during gating intervals associated with respective expected arrival times of qubits; and randomly activating the modulator outside of the gating intervals.

6. The method of claim 5, including recording the modulations made during the gating intervals in order to establish a secure key between two QKD stations of a QKD system.

7. A method of operating a modulator of a QKD station in a QKD system, comprising:

during an exchange of qubits in the QKD system, constantly randomly activating the modulator based on select modulation values, regardless of whether a qubit is expected to pass through the modulator; and recording modulation values for the modulations that actually modulate qubits.

8. The method of claim 7, including using synchronization signals that correspond with expected arrival times of qubits at the modulator to identify the modulations that actually modulate qubits.

9. A method according to claim 5, wherein randomly modulating the modulator during and outside of the gating intervals is performed such that the modulation is continuous or essentially continuous during an exchange of qubits with another QKD station.

10. A method according to claim 7, wherein the select modulation values consist of either two modulation values or four modulation values.

* * * * *